(12) United States Patent
Miyata

(10) Patent No.: US 6,783,248 B2
(45) Date of Patent: Aug. 31, 2004

(54) IMAGE DISPLAY APPARATUS

(75) Inventor: Katsuo Miyata, Osaka (JP)

(73) Assignees: Matsushita Electric Works, Ltd., Kadoma (JP); Plus Vision Corporation, Tokyo (JP)

( * ) Notice: Subject to any disclaimer, the term of this patent is extended or adjusted under 35 U.S.C. 154(b) by 0 days.

(21) Appl. No.: 10/311,306

(22) PCT Filed: Jun. 26, 2001

(86) PCT No.: PCT/JP01/05460
§ 371 (c)(1),
(2), (4) Date: Dec. 27, 2002

(87) PCT Pub. No.: WO02/01290
PCT Pub. Date: Jan. 3, 2002

(65) Prior Publication Data
US 2003/0090633 A1 May 15, 2003

(30) Foreign Application Priority Data
Jun. 27, 2000 (JP) .................................... 2000-193530
Jan. 26, 2001 (JP) .................................... 2001-19210
Mar. 27, 2001 (JP) .................................... 2001-91306

(51) Int. Cl.[7] ..................... G03B 21/20; G03B 21/14; G03B 21/16; G03B 21/18; G03B 21/22
(52) U.S. Cl. .................... 353/85; 353/119; 353/52; 353/57
(58) Field of Search ............... 353/85, 119, 52, 353/56, 57

(56) References Cited

U.S. PATENT DOCUMENTS

| 3,180,981 A | 4/1965 | Ulffers ................. 240/47 |
| 4,902,943 A | 2/1990 | Nicholson et al. ........ 315/289 |
| 5,722,753 A | 3/1998 | Okada et al. ............ 353/119 |
| 6,345,896 B1 * | 2/2002 | Kurosawa ............... 353/119 |
| 6,515,436 B2 * | 2/2003 | Kobayashi et al. ........ 315/307 |
| 2003/0160576 A1 * | 8/2003 | Suzuki .................. 315/291 |

FOREIGN PATENT DOCUMENTS

| JP | 57-199101 | 12/1982 | ........... F21V/23/00 |
| JP | 62-197030 | 8/1987 | ........... A61B/1/06 |
| JP | 62-197031 | 8/1987 | ........... A61B/1/06 |
| JP | 3-24532 | 2/1991 | ........... G03B/21/16 |
| JP | 13720/1991 | 2/1991 | ........... H01F/31/06 |
| JP | 3-83037 | 4/1991 | ........... G03B/21/16 |
| JP | 7-114805 | 5/1995 | ........... F21N/3/02 |
| JP | 7-114818 | 5/1995 | ........... F21V/23/00 |
| JP | 11-249235 | 9/1999 | ........... G03B/21/14 |

* cited by examiner

Primary Examiner—Russell Adams
Assistant Examiner—Melissa J Koval
(74) Attorney, Agent, or Firm—Oblon, Spivak, McClelland, Maier & Neustadt, P.C.

(57) ABSTRACT

A cabinet accommodates therein a discharge lamp 13, an ignitor module 7 applying a high voltage to the discharge lamp 13 for igniting the same, a lighting device 8A which is connected to the ignitor module and applies a discharging voltage to the discharge lamp so as to keep the discharge lamp turned on, a signal processing unit 9 providing an image signal in accordance with an input signal, an image display which, in response to the image signal from the signal processing unit, produces an image to be projected by use of a light of the discharge lamp 13, and a power supply supplying electric power to the above parts. At least a high voltage generating unit of the ignitor module 7 is arranged to be separated from the lighting device 8A and is disposed away from the signal processing unit 9 and close to the discharge lamp 13 for restraining malfunction of the signal processing unit.

10 Claims, 18 Drawing Sheets

Fig. 6A
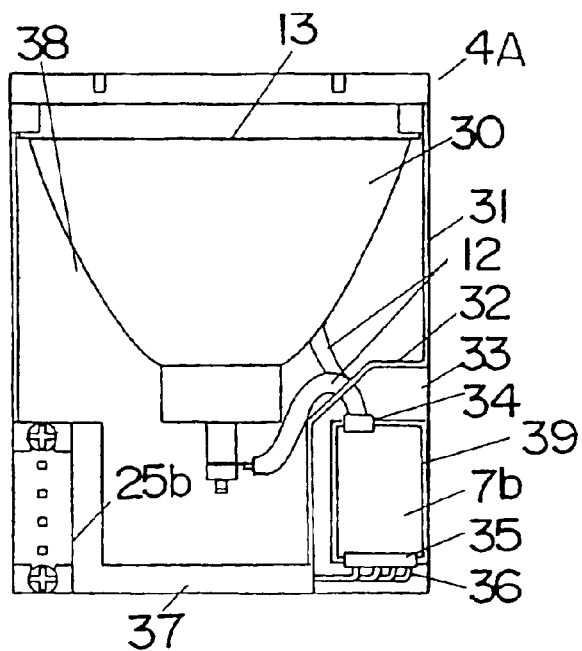
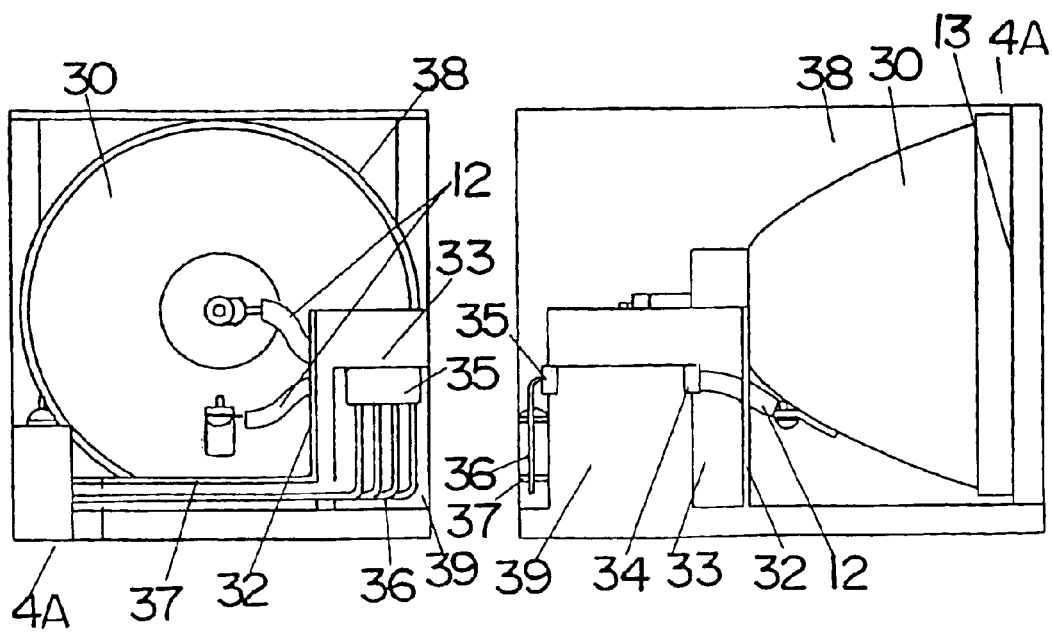
Fig. 6B
Fig. 6C

US 6,783,248 B2

IMAGE DISPLAY APPARATUS

TECHNICAL FIELD

The present invention is related to an image display apparatus for enlarging and projecting an image and picture on an image displaying element such as a liquid crystal projector, DLP projector, and a rear projection TV.

BACKGROUND ART

Referring to FIGS. 14 to 14, an explanation is made for a projector as one example of the image display apparatus such as a liquid crystal projector, DLP projector, and rear projector for enlarging and projecting still images and moving images from a personal computer, as well as video image or TV pictures from a video camera or video recorder.

FIG. 14 is a perspective view illustrating an arrangement of parts of a prior projector without a cabinet (but indicated by dotted lines). FIG. 15 is a top view illustrating the part arrangement within the projector of FIG. 14. FIG. 16 illustrates a structure of a lamp house fitted within the same projector. FIG. 17 is a circuit block diagram of the same projector.

The image display apparatus (projector) 1PA includes a cabinet 2, an image display 3, the lamp house 4, a projection lens 5, a power supply 6, an ignitor module 7, a lighting device 8, a signal processing unit 9, a plurality of forced-air cooling fans 10, and an input filter 11.

The cabinet 2 forms a case which covers the whole projector, and is provided with the signal processing unit 9 extending on back and top of the cabinet 2 except for the lamp house 4.

The image display apparatus 1PA is connected to an AC mains 26 through an AC input cable 16. The AC input cable 16 is connected to the power supply 6 through the input filter 11. The voltage of the AC mains is, for example, 100 to 240 AC Volts, which is converted at the power supply 6 into DC voltages, such as DC 370 V, DC 12 V, DC 5 V, DC 3.3 V.

Connected to the power supply 6 are the signal processing unit 9 and the lighting device 8. The image display 3 is connected to the signal processing unit 9. The image display 3 includes an image displaying element 3a formed as a liquid crystal display or DMD element, and an optical system composed of a condenser lens and a prism (not shown) for focus control of a light from the discharge lamp 13. The image displaying element 3a receives an image signal output from the signal processing unit 9 to give the resulting image which is projected by means of a light from the discharge lamp 13 of which focus is controlled by the above optical system.

The lighting device 8 is connected to the lamp house 4. In detail, the lamp house 4 includes a high intensity discharge lamp 13, a reflector 13, and a lamp socket 14b (see FIG. 16). The discharge lamp 13 such as a metal halide discharge lamp and super high pressure mercury discharge lamp (refer to Japanese Patent Publication Nos. 2-138561 and 6-52830 for example) is connected to the lighting device 8 through high voltage lead wires 12 and the lamp socket 14b. The lamp house 4, which is detachable to the projector so that the user or operator can replace the discharge lamp 13, is partly or entirely made of a resin. Numeral 42 in FIG. 16 indicates a fixture of the reflector 30.

The projection lens 5 receives the light from the discharge lamp 13 through the image display 3 in order to enlarge and project the image or picture given to the image display 3.

The power supply 6 includes a rectifier 6a, a controller 6b, a boosting chopper circuit 6c, and four DC output circuits 6d to 6g. The rectifier 6a converts the input AC voltage into the DC voltage. The controller 6b controls the boosting chopper circuit 6c. The boosting chopper circuit 6c includes an inductance L1, a MOSFET (Q1), a diode D1, and a smoothing capacitor C1 to output a DC voltage boosted to a desired level by switching the MOSFET (Q1). The DC output circuits 6d to 6g are respectively DC-DC converters which convert the output of the boosting chopper circuit 6c into desired DC voltages for supplying the same to the corresponding units. The DC output circuits 6d to 6f supply appropriate DC voltages to the signal processing unit 9, while the DC output circuit 6g supplies an appropriate DC voltage to the lighting device 8.

The lighting device 8 includes a controller 8a, a step-down chopper 8b, a polarity inverting circuit 8c, resistors R2, R3 for lamp voltage detection, and a resistor R4 for lamp current detection. The controller 8a is supplied with a DC output from the DC output circuit 6g through a capacitor C7 so as to control the step-down chopper 8b and the polarity inverting circuit 8c based upon the lamp voltage and the lamp current respectively monitored by lamp voltage detection resistors R2, R3 and the lamp current detection resistor R4. The step-down chopper 8b includes a MOSFET (Q2), a diode D2, an inductance L3, and a capacitor C3 to step-down the input DC voltage supplied through a noise filter composed of an inductance L2 and a smoothing capacitor C2 for stably providing the electric power necessary to the discharge lamp 13 by switching the MOSFET (Q2). The polarity inverting circuit 8c, composed of MOSFETs (Q3 to Q6), inverts the polarity of the DC output of the step-down chopper 8c by switching MOSFETs (Q3, Q6) alternately with MOSFETs (Q4, Q5), thereby providing an AC power to the discharge lamp 13.

The ignitor module 7 includes a resistor R1, capacitors C4 to C6, a sidac SSS, transistors T1, T2, a diode D3, and a spark-gap (GAP). The ignitor module 7 derives its operating voltage from the output voltage of the step-down chopper circuit 8b within the lighting device 8 so as to apply high voltage pulses (for example, 18 kVo-p) between electrodes of the discharge lamp 13, bringing about a breakdown to thereby start lighting the lamp.

The signal processing unit 9 is connected at its input end to the personal computer, video recorder or the like through a signal cable 17, and at its output end to the image displaying element 3a of the image display 3. The signal processing unit 9 receives an RGB signal or TV signal from the computer, video recorders or the like connected to the signal cable 17, and outputs a signal for displaying the image on the image displaying element 3a.

The forced-air cooling fans 10 are provided for avoiding a temperature rise of the heat-generating parts within the image display apparatus 1, and disposed respectively adjacent to the ignitor module 7, the power supply 6, and the lamp house 4.

The operation of the ignitor module 7 will be now explained in detail.

The ignitor module 7 operates on the output voltage from the step-down chopper circuit 8b, which charges capacitor C4 through resistor R1 so that sidac SSS become conductive to release the electric charges accumulated in capacitor C4 when capacitor C4 is charged to a break-over voltage of sidac SSS.

At this occurrence, a transient voltage is caused by a transient phenomenon in combination with an inductance as viewed from the primary side of the transformer T1, and is transferred to the secondary side of transformer T1, followed by being rectified to accumulate charge in capacitor C5. This action is repeated to increase the charged voltage across capacitor C5. When capacitor C5 is charged to the break-over voltage of the spark-gap (GAP), the spark-gap (GAP) conducts to discharge the capacitor C5. Upon this discharging, a voltage developed by a transient phenomenon in combination with an inductance as viewed from the primary side of transformer T2, is boosted at transformer T2 and is then output as high voltage pulses.

A recent technical problem for the projector concerns with a light-and-compact design for portability.

In making the projector compact, it is noted that the ignitor module 7 for igniting the light source of the discharge lamp 13 generates high voltage pulses which, as shown in FIG. 18, include frequency components of several MHz, and is cause to leak from the high voltage lead wires 12 by way of "floating capacitance" present in various portions of the cabinet 2 while the pulses are fed through a transmission path (including the high voltage lead wires 12) from the ignitor module 7 as the high voltage pulse source to the discharge lamp 13. Thus leaked portion of the high voltage is voltage-divided by the floating capacitance to be dispersed to various portions of the cabinet 2.

Although the high voltage pulses are damped, they will be transmitted to microcomputer or IC in the signal processing unit 9 within the cabinet 2 due to this floating capacitance. When the high voltage pulses finally reaching the microcomputer or IC still have a voltage higher than a surge (or electrostatic) withstand at the corresponding terminals of the microcomputer or IC, the microcomputer or IC of the signal processing unit 9 will malfunction or even the signal processing unit 9 will be broken at the worst. In order to make a protection against this occurrence, the high voltage lead wires 12 should be made as short as possible and at the same time as thick as possible.

While, on the other hand, because of that the ignitor module 7 derives its operating voltage from the output voltage of the lighting device 8 and also because of that both of the ignitor module 7 and the lighting device 8 have their outputs connected to the discharge lamp 13, the ignitor module 7 and the lighting device 8 are formed commonly on a single board such that the ignitor module 7 and the lighting device 8 thus integrated together are disposed away from the signal processing unit 9 and close to the discharge lamp 13. Since the power supply 6 is disposed remote from the ignitor module 7 and the lighting device 8 for the discharge lamp 13, the ignitor module 7 and the lighting device 8 are provided with the noise filter 15 composed of inductance L1 and capacitor C2 in order to receive the electric power from the power supply 6.

Since the lighting device 8 is made active to keep the discharge lamp 13 turned on and is disposed adjacent to the discharge lamp 13, it is subject to a heat radiation from the discharge lamp 13 such that the electronic parts of the lighting device 8 suffer from increased temperature rise also in combination with heat resulting from a power loss of the lighting device 8 itself. In order to avoid this occurrence, it is necessary to provide the forced-air cooling fan 10 for the lighting device 8 or to design the path of the forced-air cooling flow within the cabinet 2.

Taken the above points into consideration, the projector of FIGS. 14 to 17 is designed.

Japanese Patent Publication No. 7-114805 discloses a lighting apparatus for vehicle's head lamp, which is different from the image display apparatus of the present invention. The lighting apparatus includes a lamp body integrating a reflector, a discharge lamp integrated within the lamp body together with the reflector, a ballast for stably lighting the discharge lamp, and an ignitor applying a high starting voltage to the discharge lamp at the starring thereof. The ignitor has a high voltage generating unit which receives a low voltage input to generate a high voltage, and which is formed integrally with a connecting unit for the discharge lamp. The ballast and the ignitor is connected to the lamp body in such a manner that at least the connecting unit of the high voltage generating unit of the ignitor is exposed to the interior of the lamp body. In this lighting apparatus for the vehicle's headlamp, a mounting unit for mounting the discharge lamp is not formed as integral part of the high voltage generating unit.

U.S. Pat. No. 3,180,981 proposes a technique in which a lighting device for an air-cooled projection lamp has high frequency terminals and is accommodated within a lamp house provided with an exhaust port in its top. The lighting device has its output connected to the lamp through high voltage lead wires and not at the high frequency terminals. An intake port for the lamp cooling air flow and the exhaust port are not limited to particular surfaces of the lamp house. Also, the interior of the image display apparatus and the lamp house are configured such that the air-cooling flow path is established when a cabinet of the image display apparatus is fitted with the lamp house.

U.S. Pat. No. 4,902,943 discloses a plug-in starting aid apparatus which is connected to a ballast as a starting circuit of a high intensity discharge lamp for providing high voltage pulses. In this apparatus, at least three terminals project from one face of a frame, the first one being connected a voltage-responsive switch, the second one being connected to a capacitor, and the third one connected to the end of a discharging loop. In this connection, the present invention as described later is not limited to the disclosed feature that the I/O terminals project out of a casing as well as that the individual terminals are provided for connection to the voltage-responsive switch, the capacitor and the end of the discharging loop, respectively.

However, the prior art structure has technical problems that the additional parts (noise filter 15, forced-air cooling fans 10 and the like) around the lighting device are required and that the signal processing unit 9 suffers from a malfunction due to that fact that the signal processing unit 9 are arranged within a narrow space together with the ignitor module 7 generating the high voltage pulses as well as the high voltage lead wires. Accordingly, it has been desired to restrain the malfunction of the signal processing unit 9, and more preferably, to prohibit the failure, to make the apparatus compact, to reduce the operational noise, to delimit the influence of the noise to the electronic circuitry, and to increase design flexibility.

Dilsclosure of the Invention

The present invention has been accomplished in view of the above problems and has an object of providing an image display apparatus which is capable of restraining the malfunction of the signal processing unit.

The image display apparatus according to the present invention includes a cabinet which accommodates therein a discharge lamp, an ignitor module which applies a high voltage to the discharge lamp for igniting the same, a lighting device which is connected to the ignitor module and applies a discharging voltage to the discharge lamp so as to keep the discharge lamp turned on, a signal processing unit providing an image signal in accordance with an input signal, an image display which, in response to the image signal from the signal processing unit, produces an image to be projected by use of a light of the discharge lamp, and a power supply supplying an electric power to the ignitor module, the lighting device, the signal processing unit, and the image display. In this arrangement, at least a high voltage generating portion of the ignitor module is arranged to be separated from the lighting device and is disposed away from the signal processing unit and close to the discharge lamp, thereby restraining the malfunction of the signal processing unit. Also, since the high voltage generating portion of the ignitor module can itself form a single block so as to be freely arranged, in contrast to the prior art ignitor module which is incorporated into the lighting device, it can be arranged closed to the discharge lamp to reduce the leakage of the high voltage being applied to the discharge lamp, thereby enabling to reduce the malfunction or failure of the signal processing unit composed of electronic components such as a microcomputer and IC. Further, since the lighting device is away from at least the high voltage generating portion of the ignitor module, it can be arranged in a position not exposed to heat from the discharge lamp, whereby it is possible to reduce heat stress applied to the lighting device, and even to reduce the number of the forced-air cooling fans by suitably arranging the lighting device.

The ignitor module is preferred to have a lamp socket for restraining the high voltage pulsed from leaking to other portions by way of floating capacitance, thereby further restraining the malfunction or failure of the electronic circuitry of the microcomputer or IC.

Further, when the lighting device and the power supply are mounted on a common board, it is possible to eliminate the noise filter for suppression of high frequency noise superimposed on a connection line between the lighting device and the power supply and also to eliminate connectors for connection therebetween.

When the ignitor module is connected to the lighting device by wires, it is also possible to restrain the malfunction of the signal processing unit.

When the ignitor module and the lighting device are mounted on a flexible printed board, it is possible to eliminate the wires and to give an arrangement in which the ignitor module can be physically separated from the lighting device.

When the signal processing unit, the power supply, and the lighting device are mounted on opposite side of the ignitor module from the discharge lamp, it is possible to restrain the high voltage pulses from leaking to the other portions by way of the floating capacitances for restraining the malfunction or failure of the electronic circuitry of the microcomputer or IC.

Preferably, the ignitor module is composed of a high voltage generating circuit which applies the high voltage to the discharge lamp, and a power source circuit which is connected to the lighting device and provides an electric power to the high voltage generating circuit. Also, a lamp house is provided to be the cabinet and to have its interior space separated by a partition into two storage spaces, one for receiving the discharge lamp, and the other for receiving the high voltage generating circuit. Thus, the partition separating the two storage spaces can interrupt the heat radiation and ultraviolet radiation of the discharge lamp from reaching directly to the high voltage generating circuit of the ignitor module, avoiding the deterioration of the high voltage generating circuit of the ignitor module as well as the lowering of long-term reliability. As the lamp house is detachable to the cabinet, the high voltage generating circuit can be replaced with a new one simultaneously at the time of replacing the discharge lamp reaching its lamp life end, thereby realizing to provide a projector which is highly reliable in the ignition performance over a long-term use.

The high voltage generating circuit is surrounded by a case having walls, at least one of the walls forming an outer wall of the lamp house. With this arrangement, the case can interrupt the heat radiation and ultraviolet radiation of the discharge lamp from reaching directly to the high voltage generating circuit of the ignitor module, avoiding the deterioration of the high voltage generating circuit of the ignitor module as well as the lowering of long-term reliability.

The above partition is preferred to interrupt the heat radiation from the discharge lamp to the high voltage generating circuit.

Within the lamp house, there are provided lead wires for connection of the high voltage generating circuit to the power circuit of the ignitor module, and for connection of the discharge lamp to the lighting device, respectively. Preferably, the lamp house is provided with a partition which is disposed between the lead wires and the discharge lamp. Whereby, the partition can interrupt the heat radiation and ultraviolet radiation of the discharge lamp from reaching directly to the lead wires, avoiding the deterioration of the lead wires as well as the lowering of long-term reliability.

Preferably, the cabinet includes a fan which makes a forced-air cooling for the interior of the cabinet, and the high voltage generating circuit is arranged upstream of the discharge lamp with respect to a forced-air flow of the fan. With this result, the high voltage generating circuit of the ignitor module can efficiently radiate the heat.

Preferably, the high voltage generating circuit is connected to the discharge lamp through high voltage lead wires which extend from the high voltage generating circuit on its side adjacent to the discharge lamp. Thus, at the time of igniting the discharge lamp, it is possible to restrain the high voltage pulse generated at the high voltage generating circuit of the ignitor module from leaking through the floating capacitances present around various portions of the cabinet, reducing the danger of malfunctioning or breaking the microcomputer or IC.

The ignitor module is preferred to be separated into a high voltage generating unit for applying the high voltage to the discharge lamp and a power source unit which supplies an electric power to the high voltage generating unit. Thus, it is possible to restrain the malfunction or failure of the signal processing unit, to make the apparatus compact and light-weight, to reduce the operational noise, to delimit the influence of the noise to the electronic circuitry, to increase design flexibility, and yet to improve reliability of the apparatus even when the lamp house could not afford the space for accommodating the entire ignitor module.

The high voltage generating unit may be arranged close to the discharge lamp, enabling to improve reliability of the apparatus even when the lamp house could not afford the space for accommodating the entire ignitor module.

Preferably, the high voltage generating unit is arranged closer to the discharge lamp than the power source unit, thereby enabling to restrain the malfunction or failure of the signal processing unit, to make the apparatus compact and light-weight, to reduce the operational noise, to delimit the influence of the noise to the electronic circuitry, to increase design flexibility.

At least the high voltage generating unit is preferred to be arranged in the lamp house detachably receiving the discharge lamp. Thus, it is easy to modify the design of the high voltage generating unit of the ignitor module.

The lamp house is preferred to include a storage section receiving at least the high voltage generating unit for effectively avoiding the malfunction of the signal processing unit.

Preferably, the storage section is filled with an insulation material to enhance the insulation of the high voltage generating unit.

BRIEF DESCRIPTION OF THE DRAWINGS

FIGS. 6A, 6B, and 6C are respectively top view, rear view, and side view of a lamp house of the above image display apparatus.

BEST MODES FOR CARRYING OUT THE INVENTION

<First Embodiment>

Figure 1:
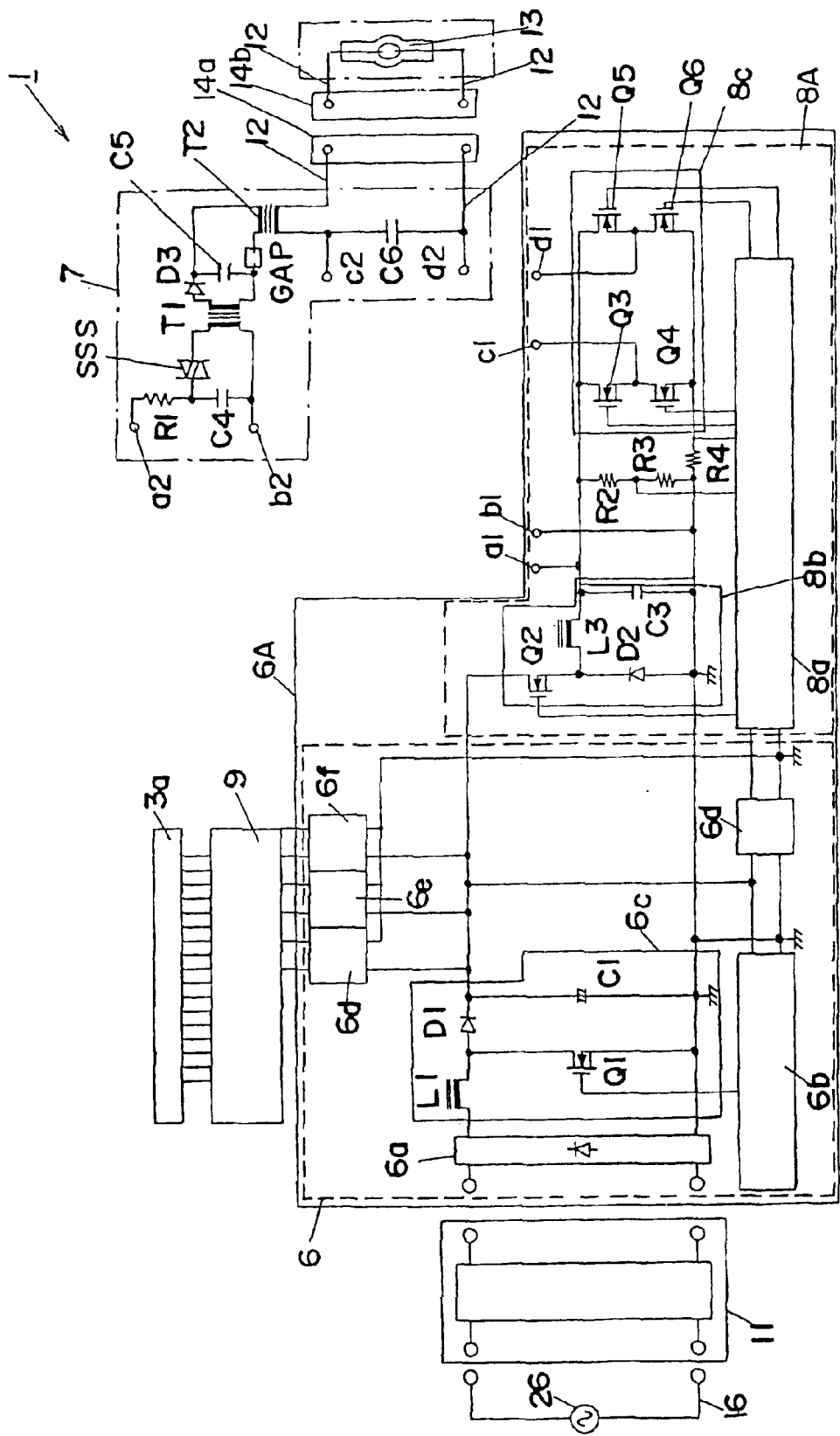
FIG. 1 is a circuit block diagram of an image display apparatus in accordance with a first embodiment of the present invention.
Figure 2:
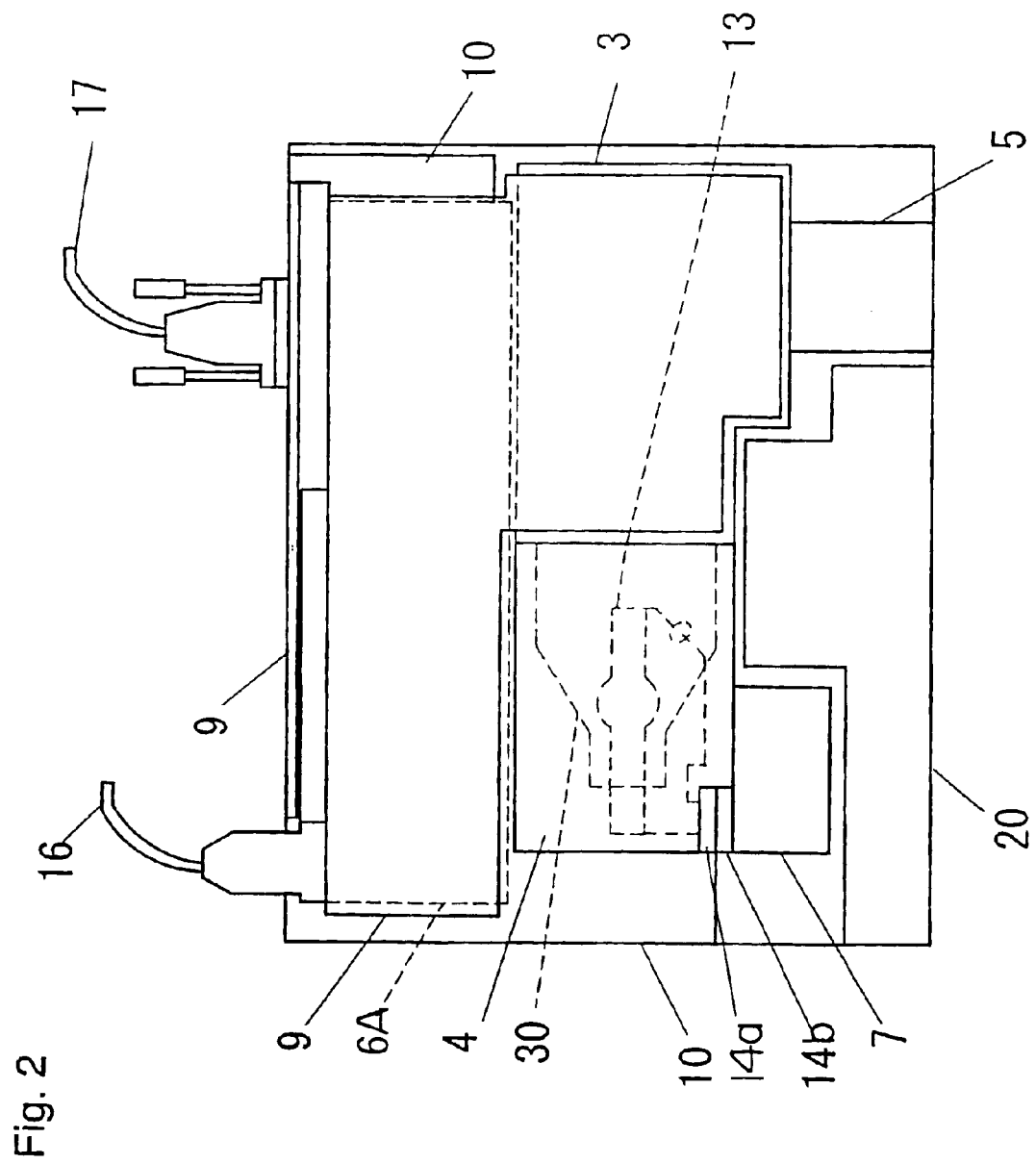
FIG. 2 illustrates the internal structure of the image display apparatus.

FIG. 1 illustrates a circuit block diagram of an image display apparatus in accordance with a first embodiment of the present invention. FIG. 2 illustrates the internal arrangement of the above image display apparatus.

The image display apparatus 1 is arranged differently from the prior art in that the power supply 6 and the lighting device 8A are mounted on a common board as a combined assembly 6A but excluding the noise filter 15, capacitor C7, and the ignitor module 7, and in that the lighting device 8A of the combined assembly 6A is connected to the separate ignitor module 7 by means of wires bridging between output terminals (a1–a2) and (b1–b2), and in that the high voltage lead wires 12 are made short. The other arrangements are identical to those explained and the like parts are designated by the like numerals without duplicate explanation thereof.

As a consequence of that the ignitor module 7 is connected to the separately formed lighting device 8A, the polarity inverting circuit 8c of the lighting device 8A is connected to the ignitor module 7 by means of wires between output terminals (c1–c2) and (d1–d2).

According to the first embodiment, the high voltage lead wires 12 connecting the ignitor module 7 and the discharge lamp 13 are made short so that the high voltage pulses generated at the ignitor module 7 are applied to the discharge lamp 13 only through a minimum path, thereby restraining the high voltage from leaking through floating capacitance to other portions and therefore restraining the malfunction or failure of the electronic circuit of the microcomputer or IC. Also, it is possible to restrain the attendant noise from spreading to the electronic circuit board (except for the lighting device 8A) for processing image signals within an electromagnetically shielded space.

Figure 17:
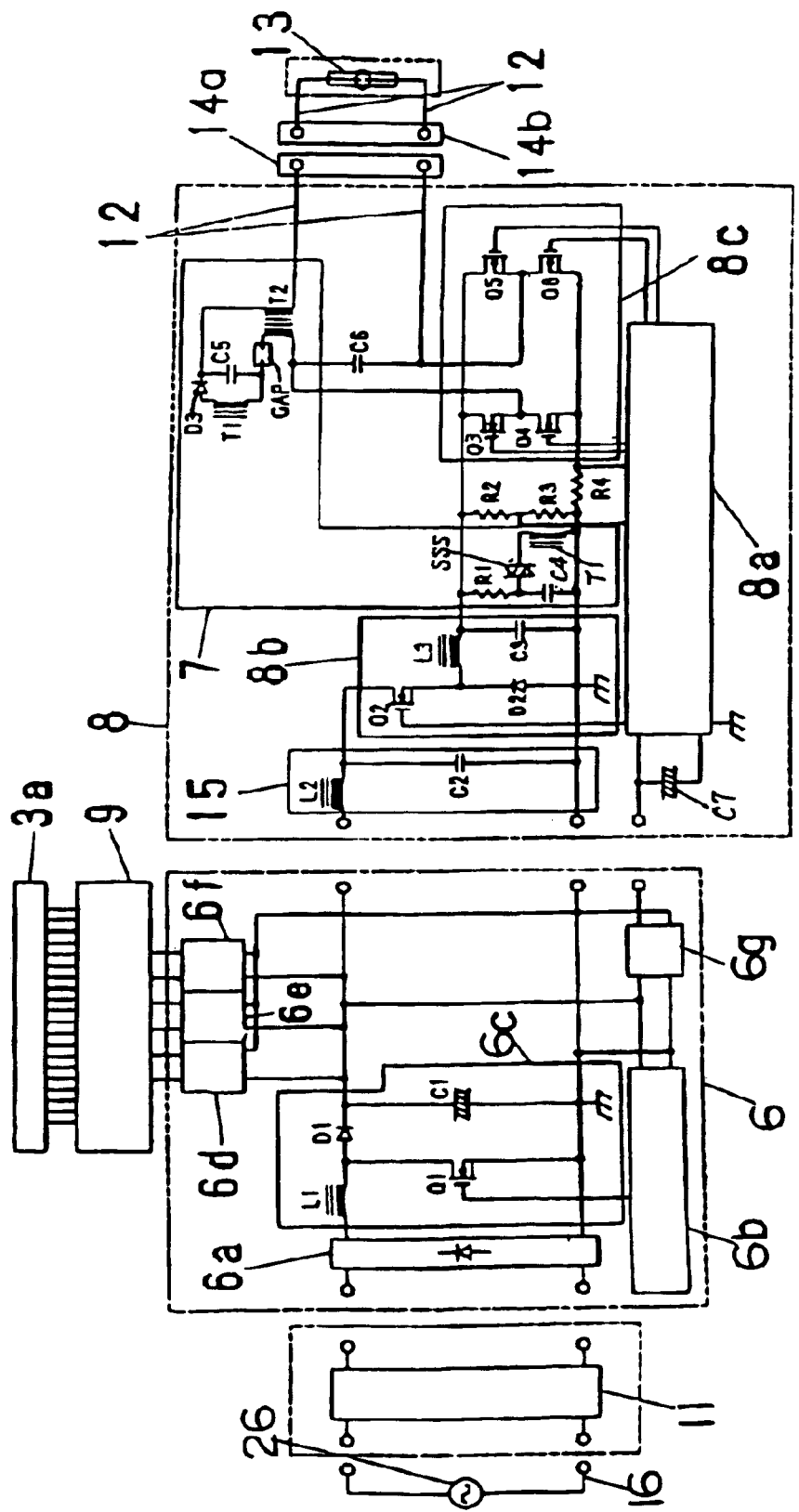
FIG. 17 is a circuit block diagram of the above projector.
Figure 18:
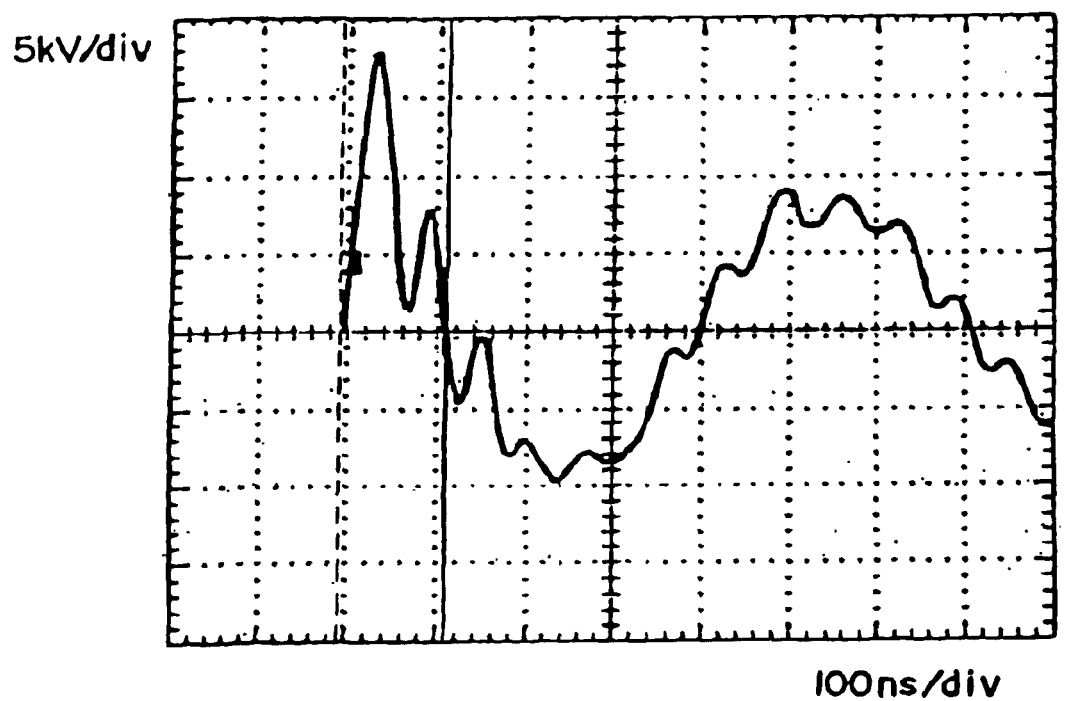
FIG. 18 is a waveform chart of high voltage pulses generated at the ignitor module.

Further, since the power supply 6 and the lighting device 8A are mounted on the common board, it is possible to increase a removable space 20 (see FIG. 2), to eliminate one of the force-air cooling fans 10, and also to eliminate the noise filter 15 and the connector that are necessary for connection of the power supply 6 and the lighting device 8 as shown in FIG. 17, thereby realizing the compact and light-weight arrangement of the image display apparatus 1. Further, by the elimination of the force-air cooling fan 10, it is possible to reduce the noise level and therefore the operational noise of the image display apparatus 1.

It is noted that the ignitor module 7 for the projector is designed for large current and high voltage and is a most bulky part among the parts forming the lighting device of FIG. 17. However, by separating the ignitor module 7 from the lighting device 8A, it is possible to improve design flexibility of the image display apparatus 1.

As seen in FIG. 2, the ignitor module 7 is disposed on one side (lower left side in the figure) of the discharge lamp 13, while the signal processing unit 9 and the combined assembly 6A are disposed on the other side (upper and right sides in the figure). Thus, the high voltage pulses can be restrained from leaking to the other side through the floating capacitance, thereby restraining the malfunction or failure of the electronic circuitry of the microcomputer or IC.

<Second Embodiment>

Figure 3C:
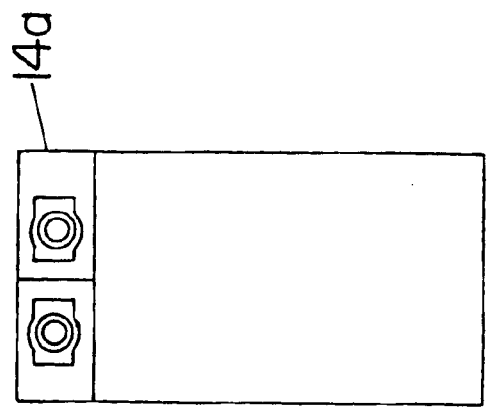
FIG. 3C illustrates the face as viewed from A in FIG. 3A.
Figure 3A:
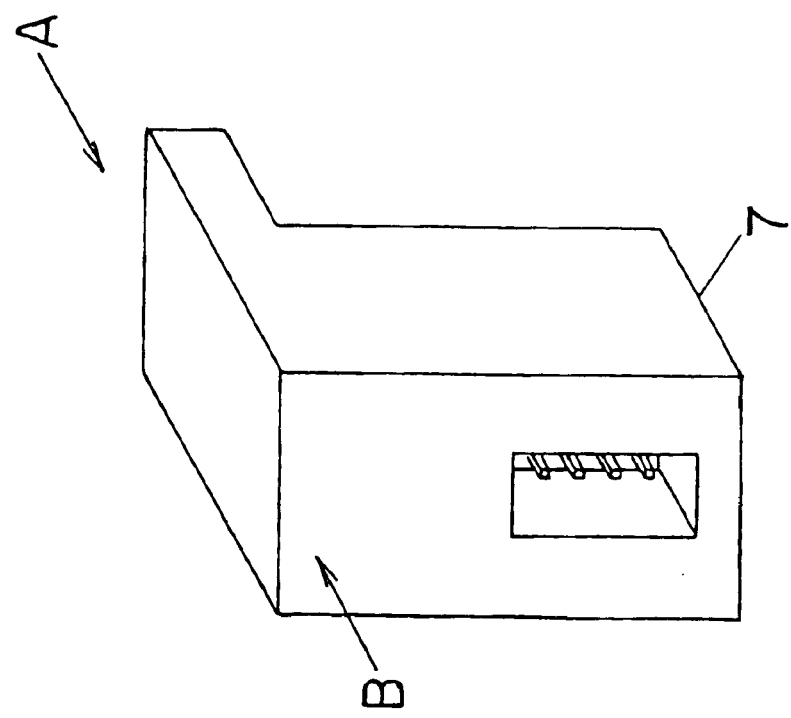
FIG. 3A is a perspective view of the ignitor module separated from a combined assembly of an image display apparatus in accordance with a second embodiment of the present invention.
Figure 3B:
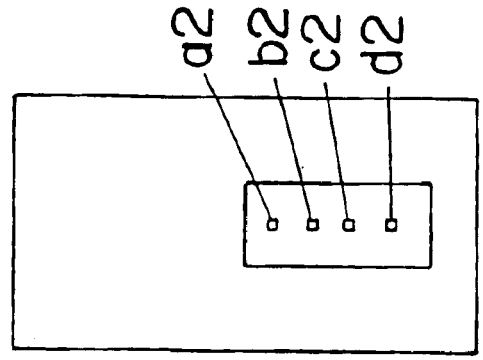
FIG. 3B illustrates the face as viewed from B in FIG. 3A.

FIG. 3A is a perspective view illustrating the ignitor module shown as being detached from the combined assembly 6A with regard to the image display apparatus in accordance with the second embodiment of the invention, FIG. 3B is a B-direction face view for illustration of connecting terminals (a2, b2, c2, and d2) for connection with the combined assembly 6A, and FIG. 3C is a C-direction face view for illustration of a lamp socket 14a fixed to the ignitor module 7.

The image display apparatus of the second embodiment differs from the first embodiment in that the ignitor module 7 is provided with the lamp socket 14a. The other structures are identical to the first embodiment and are referenced by the same numerals without the duplicate explanation thereof.

According to the second embodiment in which the ignitor module 7 includes the lamp socket 14a, it is possible to restrain the high voltage pulses from leaking to the other portions through the floating capacitance and therefore restrain the malfunction or failure of the electronic circuit of the microcomputer or IC.

<Third Embodiment>

The image display apparatus in accordance with the third embodiment of the invention differs from the first embodiment in that the ignitor module 7 is connected to the lighting device 8A by means of wires.

According to the third embodiment, the ignitor module 7 is connected through the wires to the lighting device in the combined assembly 6A to give a physical distance between them in order to obtain the same effect as in the first embodiment.

<Fourth Embodiment>

The image display apparatus in accordance with the fourth embodiment of the invention differs from the first embodiment in that the ignitor module 7 and the combined assembly 6A have their circuits formed on a flexible printed board.

According to the fourth embodiment in which the ignitor module 7 and the combined assembly 6A have their circuits formed on the flexible printed board, it is made to give a physical distance between the ignitor module 7 and the lighting device 8A of the combined assembly 6A for realizing the same effect as the first embodiment.

<Fifth Embodiment>

Figure 4:
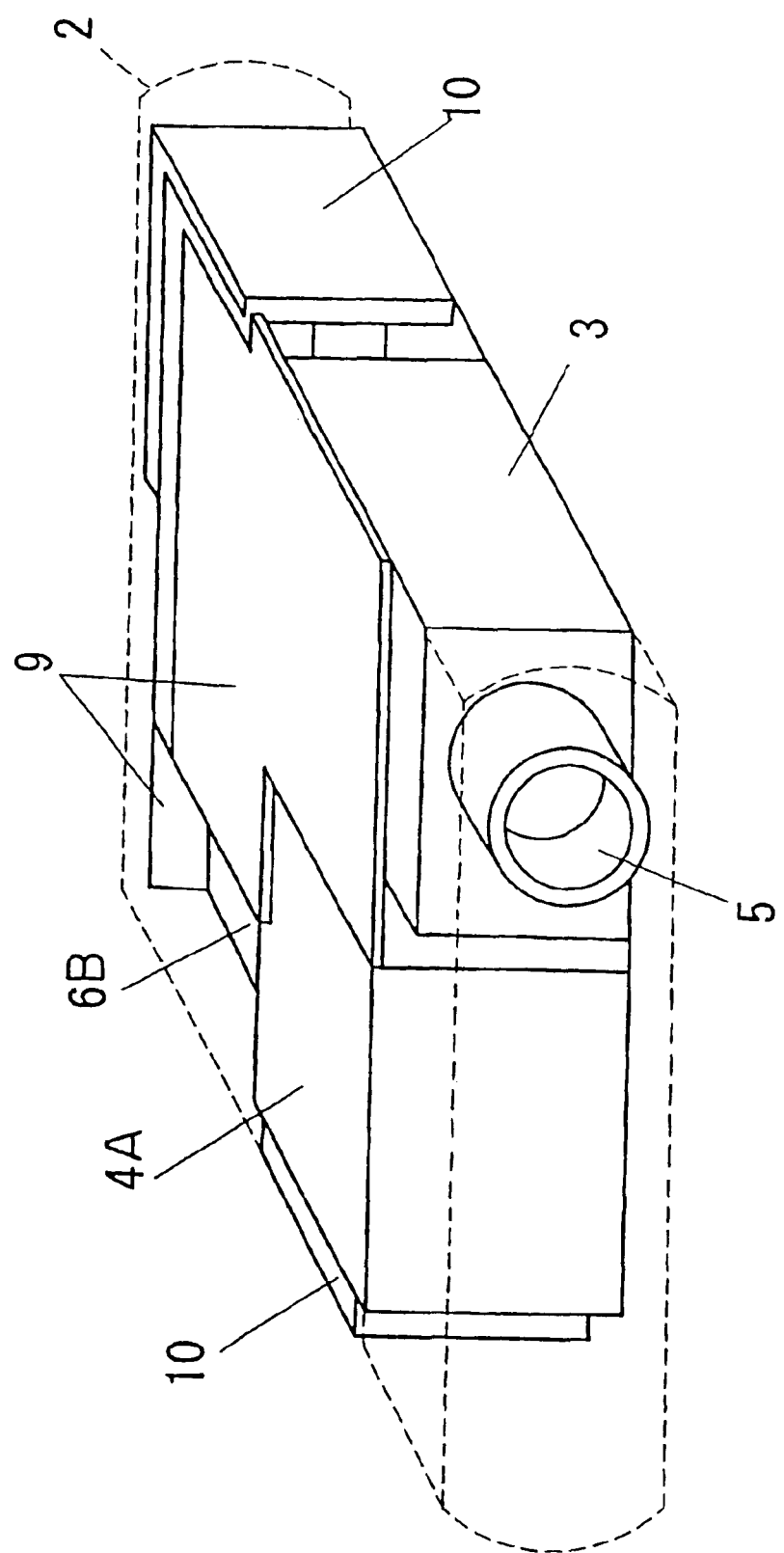
FIG. 4 is a perspective view illustrating an arrangement of various parts of an image display apparatus in accordance with a fifth embodiment of the present invention.
Figure 5:
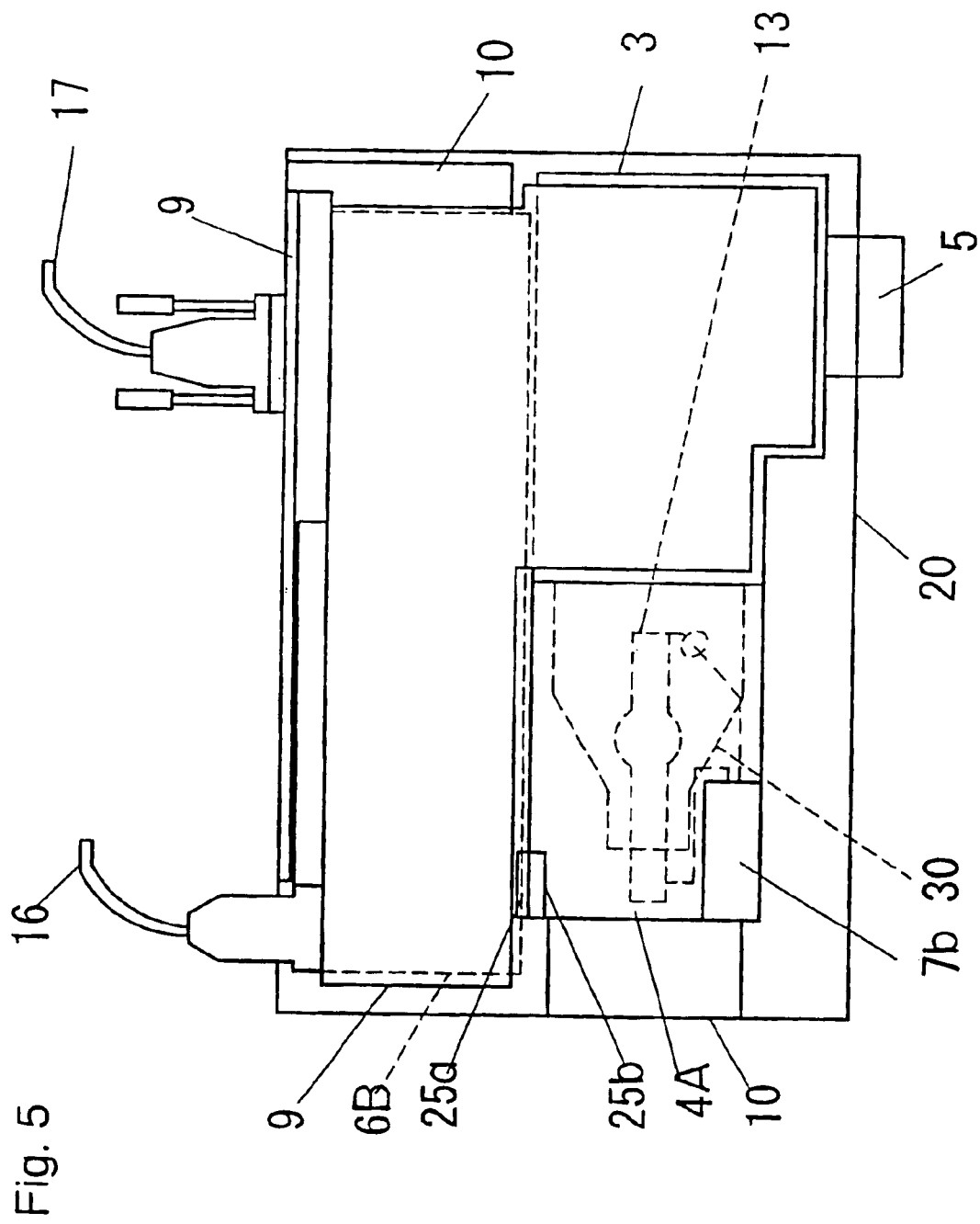
FIG. 5 is a view illustrating the arrangement of various parts of the above image display apparatus.
Figure 7:
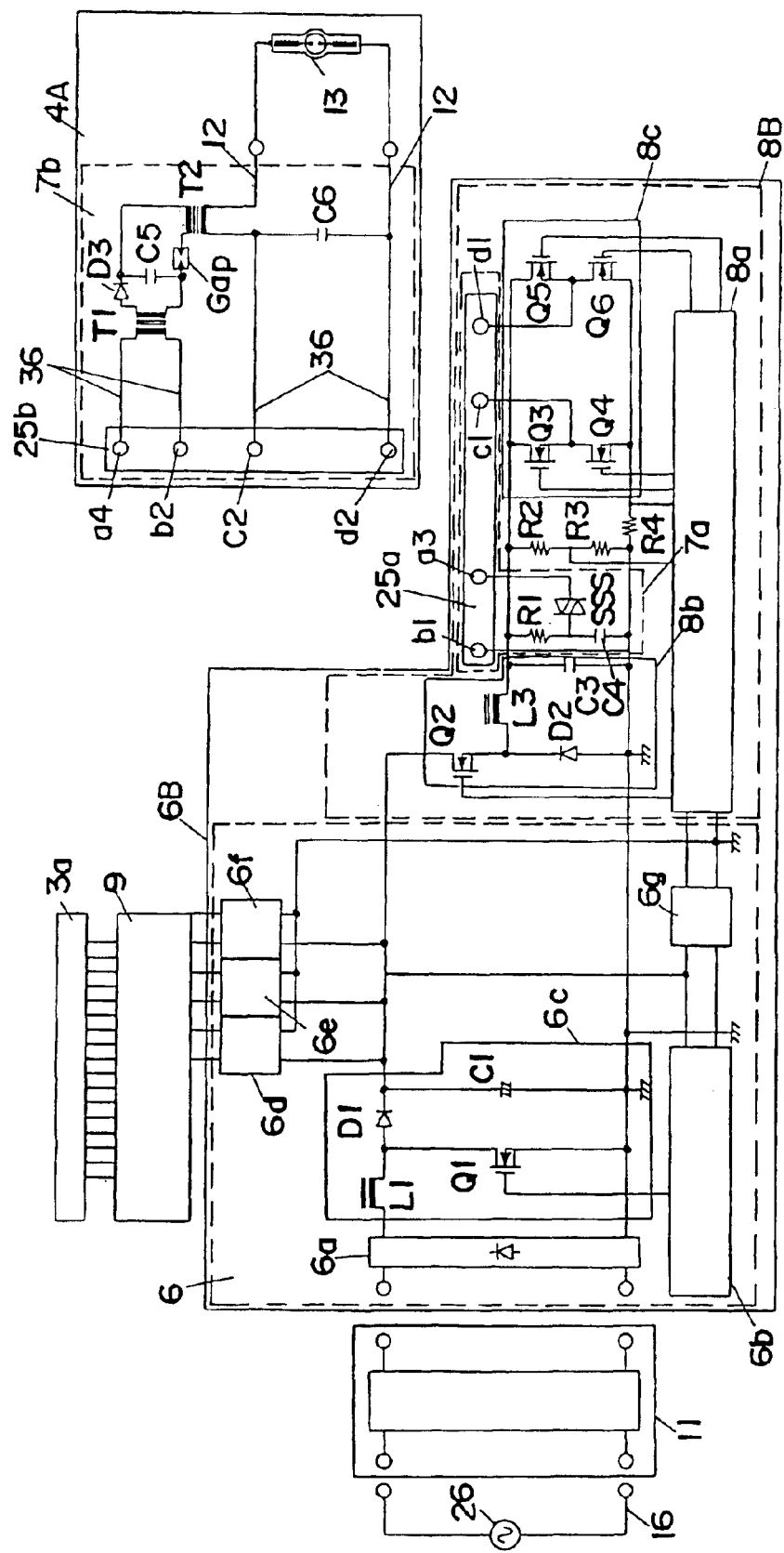
FIG. 7 is a circuit block diagram of the above image display apparatus.

FIG. 4 is a perspective view illustrating various parts within the image display apparatus in accordance with the fifth embodiment of the invention. FIG. 5 is a top view illustrating the various parts of the image display apparatus. FIGS. 6A, 6B, and 6C are respectively top view, rear view, and side view of the lamp house of the image display apparatus. FIG. 7 is a circuit block diagram of the image display apparatus. The like parts and structures are indicated by the like reference marks and duplication explanation thereof is omitted.

According to the fifth embodiment, the ignitor module 7 shown in FIG. 1 is divided into a power source circuit 7a composed of resistor R1, capacitor C1, and sidac SSS, and a high voltage generating circuit 7b composed of transformers T1, T2, diode D3, capacitors C5, C6, and spark-gap (GAP).

The power source circuit 7a is arranged within the lighting device 8A of the combined assembly 6A mounted/on the board. Hereinafter, the lighting device BA additionally incorporating the power source circuit 7a is referred to as lighting device 8B, whereas the combined assembly 6A is referred to as the combined assembly 6B. Further, the high voltage generating circuit 7b is arranged within the lamp house 4. Hereinafter, the lamp house 4 accommodating therein the high voltage generating circuit 7b is referred to as the lamp house 4A.

The lamp house 4A is made detachable to the cabinet 2, and is formed partly or entirely by a plastic resin. The discharge lamp 13 is disposed within the lamp house 4A with its optical axis aligned in the longitudinal direction of the lamp house. A reflector 30 is disposed to extend from behind the lamp to the forwardly of the lamp. The lamp house is formed on either opposite side with an outer shell 31 and has its rear opened. The outer shell 31 at one side of the lamp house is formed with a partition 32 which extends from the rear of the outer shell into interior of the lamp house 4A to give a lamp storage space 38 for accommodating the discharge lamp 14 and an ignitor storage space 33 for accommodating the high voltage generating circuit 7, which spaces are separated from each other by the partition 32.

The high voltage generating circuit 7b received within the ignitor storage space 33 is surrounded by a case 39 which is provided on its front end with a bushing 34 for drawing out the two high voltage lead wires 12, and on its rear end with the four lead wires 36 for supplying the input power to the high voltage generating circuit 7b. The opposite side walls of the case 39 share the outer walls of the lamp house 4A. The partition 32 separating the lamp storage space 38 from the ignitor storage space 33 is cooperative with the casing 39 to interrupt the heat radiation and ultraviolet radiation from the discharge lamp 13, enabling to avoid the deterioration as well as the lowering of the long-term reliability of the high voltage generating circuit 7b.

The high voltage lead wires 12 are drawn out from the front end of the high voltage generating circuit 7b, i.e., from a portion adjacent to the input terminals of the discharge lamp 13 so as to connect the high voltage generating circuit 7b to the discharge lamp 13 by a minimum distance. Whereby the high voltage pulses generated from the high voltage generating circuit 7b at the time of starting the lamp can be restrained from leaking through floating capacitances present at various portions of the cabinet 2, reducing the danger of the malfunction or failure of the microcomputer or IC.

The lead wires 36 are provided for connection of the lighting device 8B to a lamp socket 25b on the rear at one side of the lamp house 4A. The lamp socket 25b is coupled to an associated lamp socket 25a at the output end of the lighting device 8B (terminals a3, b1, c1, d1 of 25a corresponds to terminals a4, b2, c2, and d2 of 25b), so that the output from the lighting device 8E is supplied to the high voltage generating circuit 7b as well as to the discharge lamp 13. The lamp socket 25b is arranged in a spaced separated from the lamp storage space 38 by an L-shaped partition 37 formed on the rear end of the lamp storage space 38 and is protected by the partition 37 which interrupts the head radiation and the ultraviolet radiation from the discharge lamp 13 for avoiding the deterioration and the lowering of the long-term reliability.

The power supply 6 and the lighting device 8B are mounted on the common board to thereby eliminate the noise filter 15 and the capacitor C7 as utilized in the prior art of FIG. 17.

Figure 8:
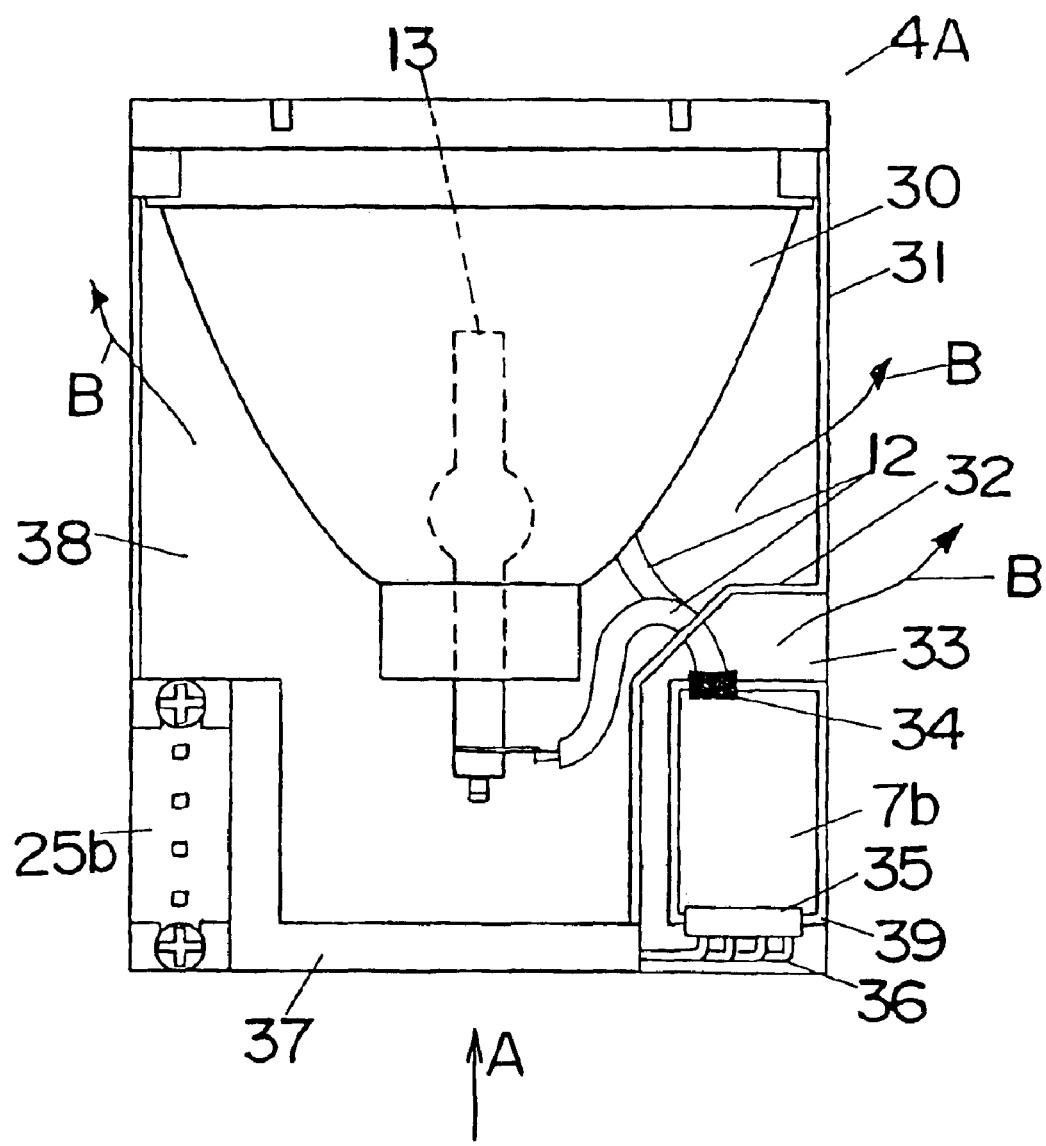
FIG. 8 is an explanatory view for the air-cooling within the lamp house of the above image display apparatus.

Further, since the high voltage generating circuit 7b is arranged close to the discharge lamp 13, it is preferred to provide the force-air cooling fan 10 such that, as shown in FIG. 8, the flow direction A extends from behind the lamp house 4A towards its front end. Thus, the high voltage generating circuit 7b is disposed upstream of the discharge lamp 13 with the air flowing along a direction of B, whereby it is possible to reduce the amount of the radiant heat directing to the discharge lamp as well as to radiate the heat of the high voltage generating circuit 7b effectively.

It is noted that the spark-gap has its life-time which in turn determines the life-time of the high voltage generating circuit 7b and even the projector. In the fifth embodiment, however, the high voltage generating circuit 7b can be replaced with the new one at the time of replacing the discharge lamp 13, enabling to provide the projector which is reliable over the long-term use in starting the lamp.

<Sixth Embodiment>

Figure 9:
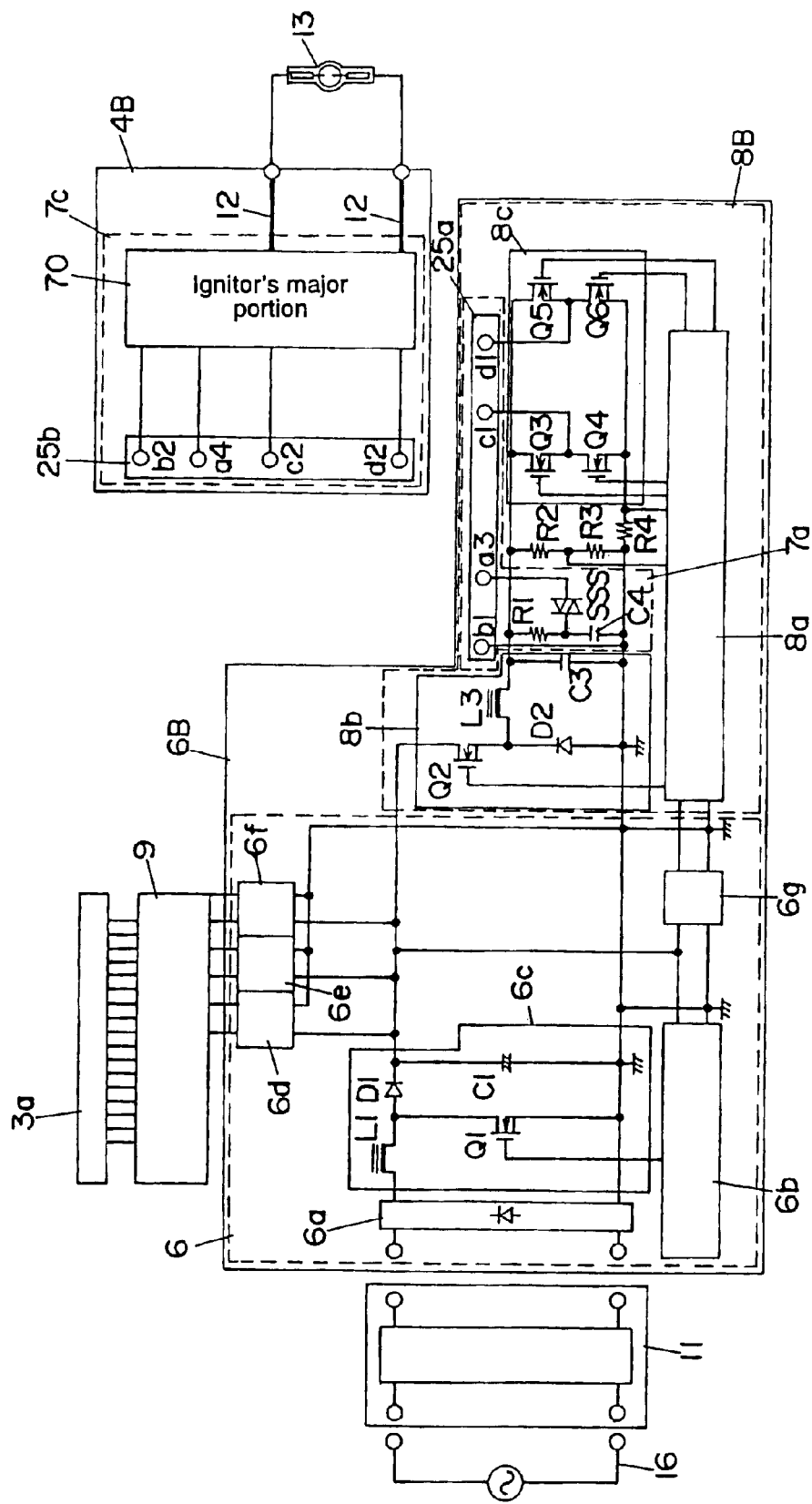
FIG. 9 is a circuit diagram of an image display apparatus in accordance with a sixth embodiment of the present invention.
Figure 10:
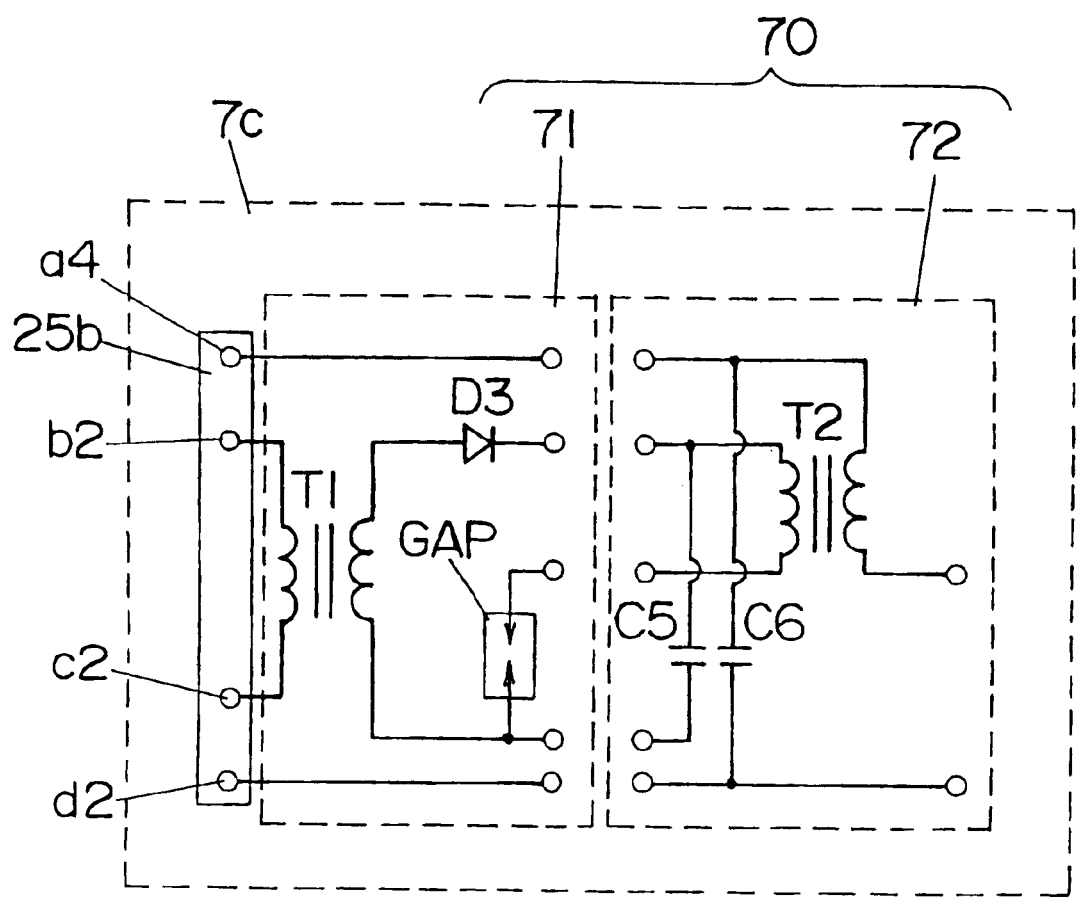
FIG. 10 is a partial circuit diagram of the ignitor module of FIG. 9.
Figures 11A, 11B, 11C:
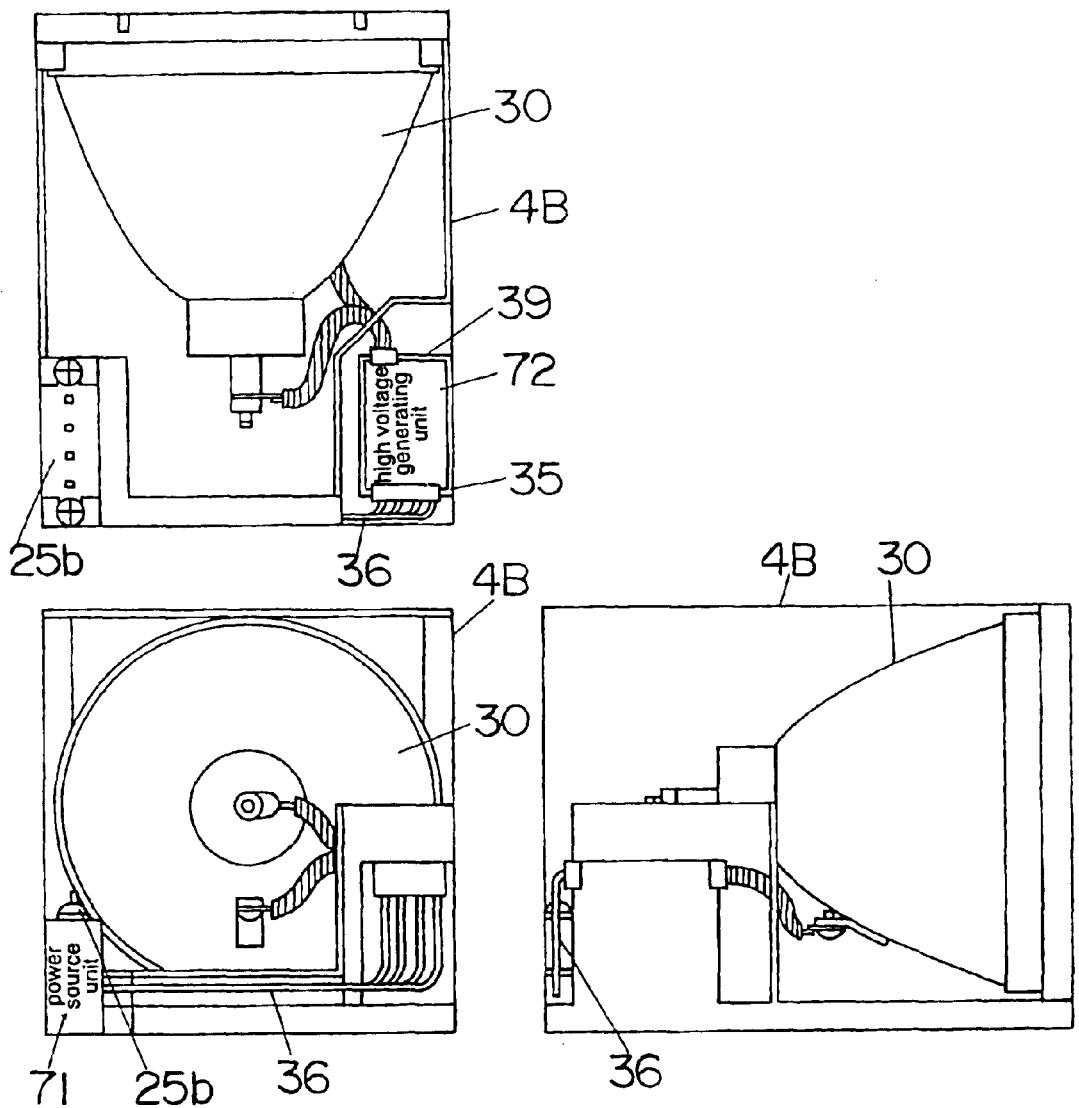
FIGS. 11A, 11B, and 11C are respectively top view, rear view, and side view of a lamp house of the above image display apparatus of FIG. 9.

FIG. 9 is a circuit diagram of the image display apparatus in accordance with the sixth embodiment of the present invention. FIG. 10 is a partial circuit diagram of the ignitor module shown in FIG. 9. FIG. 11 illustrates the manner in which the ignitor module of FIG. 10 is accommodated. FIG. 1A is a top view, FIG. 11B is a rear view, and FIG. 11C is a side view.

The image display apparatus in accordance with the sixth embodiment differs from that of the fifth embodiment in that, as shown in FIG. 9, the ignitor module includes the power source circuit 7a formed as a front end between the step-down chopper circuit 8b and the polarity inverting circuit 8c of the lighting device 8B in the combined assembly 6B, in addition to the high voltage generating circuit 7c formed as a rear end and separately from the power source circuit 7a.

As in the fifth embodiment, the power source circuit 7a is composed of resistor R1, capacitor C4, sidac SSS arranged at the output of the step-down chopper 8b, and lamp socket 25a. The lamp socket 25a includes a terminal (a3) connected one end of the sidac SS of which other end is connected to a point between resistor R1 and capacitor C4, a terminal (b1) connected to the ground, a terminal (c1) connected to a point between MOSFETs (Q3 and Q4), and a terminal (d1) connected to a point between MOSFETs (Q5 and Q6).

The high voltage generating circuit 7c is composed of the lamp socket 25b and the ignitor's major portion 70 connected to the lamp socket. The lamp socket 25b has terminals (a4, b2, c2, and d2) connected respectively to the terminals (a3, b1, c1, and d1) of the lamp socket 25a. As shown in FIG. 10, the ignitor's major portion 70 is composed of a high voltage generating unit 72 generating the high voltage pulses, and a power source unit 71 at the rear end. The high voltage generating unit 72 includes capacitors C5, C6, and a transformer T2 to generate the high voltage pulses, while the power source unit 71 includes a transformer T1, a diode D3, and a spark-gap (GAP) to supply the electric power to the high voltage generating unit 72 for causing it to generate the high voltage pulses. As shown in FIG. 9, the ignitor's major portion 70 is connected to the discharge lamp 13 through the high voltage wires 12 (refer to FIG. 17), while the high voltage generating unit 72 is interposed between the polarity inverting circuit 8c and the discharge lamp 13.

Also in the sixth embodiment, the high voltage generating circuit 7c is accommodated within the lamp house 4B, as shown in FIG. 11. The high voltage generating unit 72 is packed within the case 39, while the power source unit 71 is disposed at a position remote from the high voltage generating unit 72. The power source unit 71 and the high voltage generating unit 72 are connected to each other by means of four lead wires 36. The case 39 is filled with a high dielectric resin (such as epoxy resin). Numeral 35 in FIG. A indicate the bushing. The four lead wires 36 may be equipped with intermediate couplers.

In the sixth embodiment thus configured, since the ignitor module is divided into the power source circuit 7a as the front end and the high voltage generating circuit 7c as the rear end, and also since the high voltage generating circuit 7c is further divided into the power source unit 71 and the high voltage generating unit 72, the high voltage generating unit 72 can be at least arranged within the lamp house 4B or in proximity thereto (within the lamp house 4B in FIG. 11) with the remaining parts arranged in the other space. Thus, even if the lamp house 4B affords no space for accommodating the entire ignitor module, the ignitor module can be successfully assembled with increased reliability.

Also, by changing the capacitance of capacitor C5 and the coil of the transformer T2, it is possible to modify the characteristic of the high voltage pulses as well as a tolerable limit for the load current (lamp current) flowing through the transformer T2, thereby changing only the high voltage generating unit 72 of the ignitor module in compliance with the discharge lamps of different specifications. With this result, it is possible to reduce the developing time, the investment to the forming dies, and the developing cost, thereby contributing to cut the whole cost and enabling to provide the ignitor module at the low cost and in short-time period.

<Seventh Embodiment>

Figure 12:
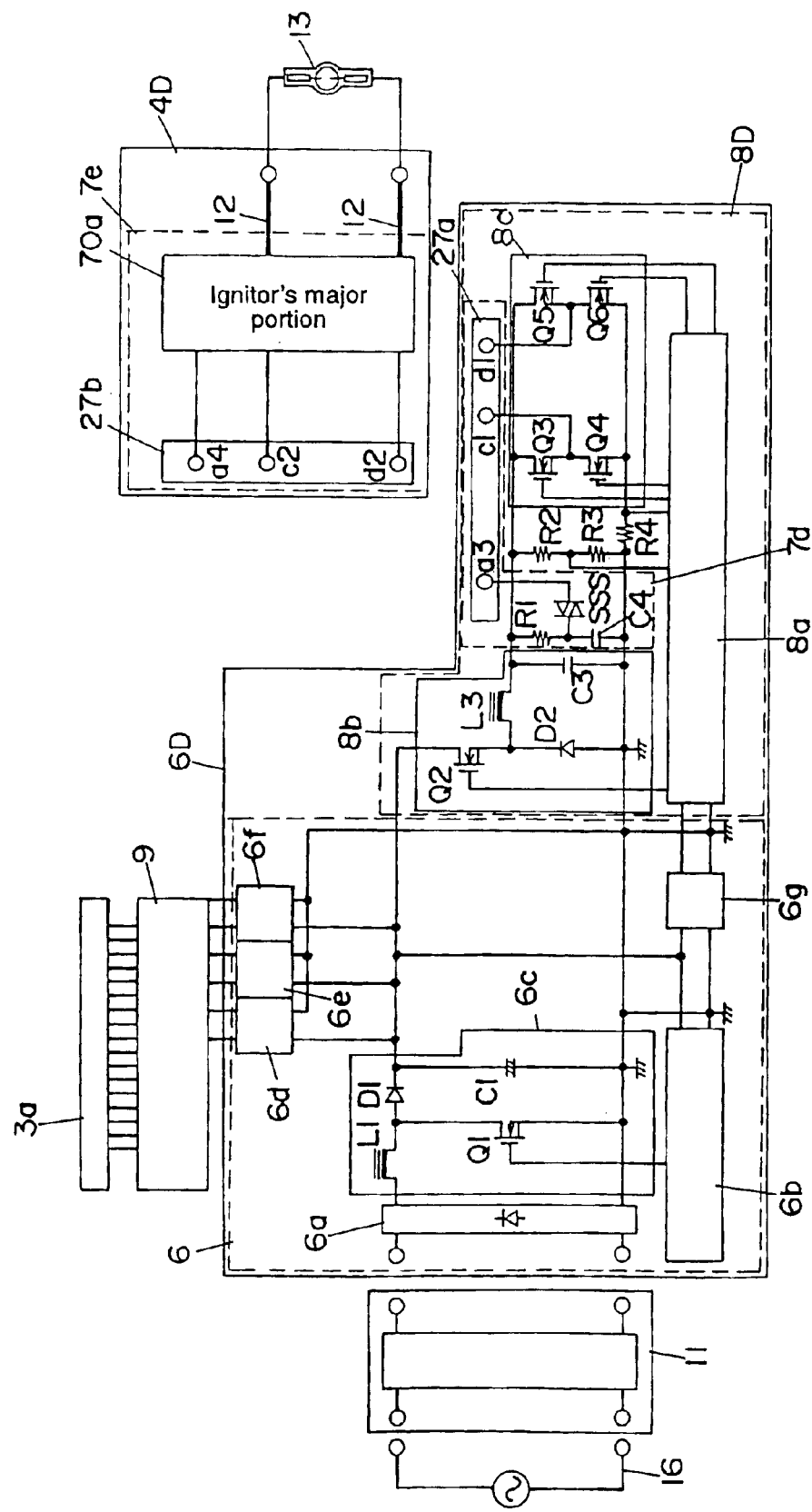
FIG. 12 is a circuit diagram of an image display apparatus in accordance with a seventh embodiment of the present invention.
Figure 13:
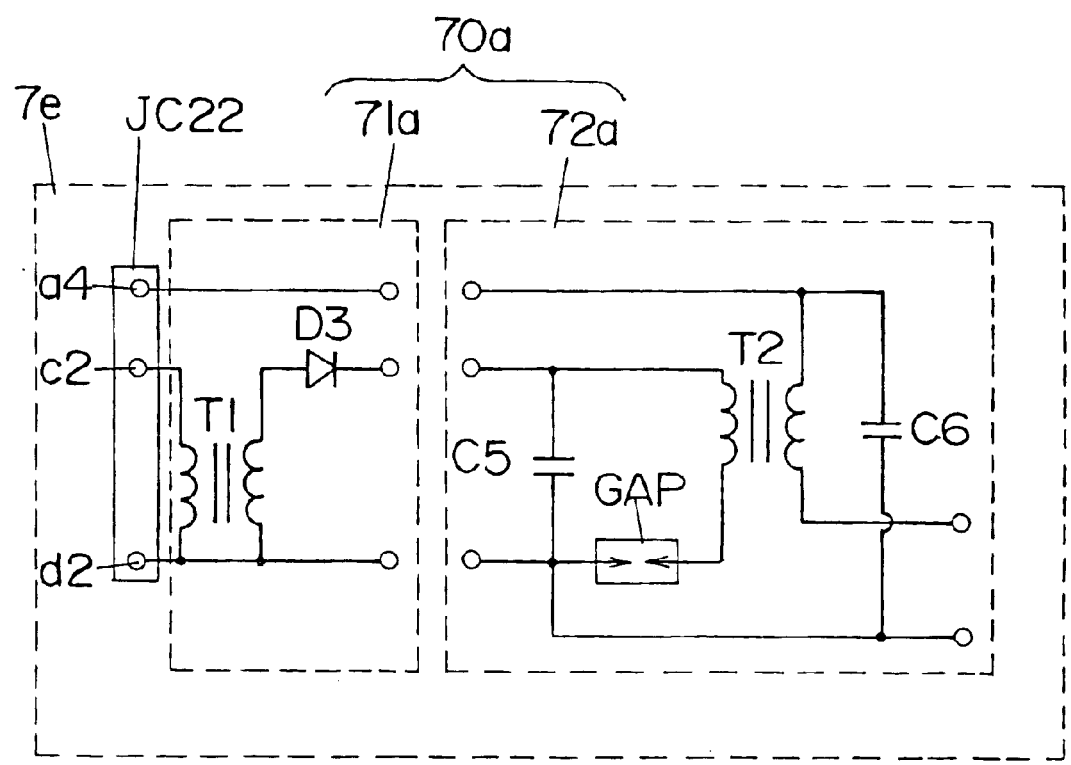
FIG. 13 is a partial circuit diagram of the ignitor module of FIG. 12.

FIG. 12 is a circuit diagram of the image display apparatus in accordance with the seventh embodiment of the present invention. FIG. 13 is a partial circuit diagram of the ignitor module shown in FIG. 12.

The image display apparatus according to the seventh embodiment differs from that of the sixth embodiment in that, as shown in FIG. 12, the ignitor module is composed of the power source circuit 7d formed as a front end between the step-down chopper circuit 8b and the polarity inverting circuit 8c, and of the high voltage generating circuit 7e formed as a rear end and separately from the power source circuit 7d.

The power source circuit 7d is composed of resistor R1, capacitor C4, sidac SSS arranged at the output of the step-down chopper 8b, and lamp socket 27a. The lamp socket 27a includes a terminal (a3) connected one end of the sidac SSS, a terminal (c1) connected to a point between MOSFETs (Q3 and Q4), and a terminal (d1) connected to a point between MOSFETs (Q5 and Q6).

The high voltage generating circuit 7e includes a lamp socket 27b and the ignitor's major portion 70a connected to the lamp socket 27b. The lamp socket 27b has terminals (a4, c2, and d2) connected respectively to the terminals (a3, c1, and d1) of the lamp socket 27a. As shown in FIG. 13, the ignitor's major portion 70a includes the high voltage generating unit 72e and the power source unit 71a. The high voltage generating unit 72e is composed of capacitors C5, C6, spark-gap (GAP), and transformer T2 to generating the high voltage pulses, while the power source unit 71a is composed of transformer T1 and diode D3 to supply the electric power to the high voltage generating unit 71a for causing it to generate the high voltage pulses.

Also in the seventh embodiment, the high voltage generating circuit 7e is accommodated within the lamp house 4D of the same configuration as the lamp house of the sixth embodiment. The high voltage generating unit 72a is packed within the case 39, while the power source unit 71a is disposed at a position remote from the high voltage generating unit 72a (refer to FIG. 11). The three lead wires 36 are utilized.

In the seventh embodiment thus configured, since the ignitor module is divided into the power source circuit 7d as the front end and the high voltage generating circuit 7e as the rear end, and also since the high voltage generating circuit 7c is further divided into the power source unit 71a and the high voltage generating unit 72a, the high voltage generating unit 72a can be at least arranged within the lamp house 4D or in proximity thereto (within the lamp house 4D in FIG. 12) with the remaining parts arranged in the other space. Thus, even if the lamp house 4D affords no space for accommodating the entire ignitor module, the ignitor module can be successfully assembled with increased reliability.

Also, the spark-gap (GAP) as well as capacitor C5 that determine the life-time of the ignitor module can be replaced together with the discharge lamp 13, the starting performance of the image display apparatus can be refreshed each time upon replacement of the discharge lamp 13.

What is claimed is:

1. An image display apparatus, comprising:
   a cabinet, said cabinet accommodating therein:
   a discharge lamp;
   an ignitor module which applies a high voltage to said discharge lamp for igniting the same;
   a lighting device which is connected to said ignitor module and applies a discharging voltage to said discharge lamp so as to keep said discharge lamp turned on;
   a signal processing unit providing an image signal in accordance with an input signal;
   an image display which, in response to said image signal from said signal processing unit, produces an image to be projected by use of a light of said discharge lamp; and
   a power supply supplying electric power to said ignitor module, said lighting device, said signal processing unit, and said image display; wherein
   said power supply provides a voltage power to said ignitor module through said lighting device,
   said ignitor module including a transformer which boosts said voltage power into a high voltage, and including a high voltage generating circuit which applies to said discharge lamp said high voltage,
   said lighting device generating a voltage from said voltage power, after said discharge lamp is ignited, for keeping said discharge lamp turned on;
   said ignitor module being physically separated from said power supply as well as from said lighting device,
   said cabinet accommodating said ignitor module within a first interior space close to said discharge lamp, and accommodating signal processing unit, said power supply and said lighting device as being separated from said ignitor module within a second interior space opposite from said first interior space,
   a lamp house being provided to be detachable from said cabinet, said lamp house having a lamp house interior space separated by a partition into two storage spaces, one for receiving said discharge lamp, and the other for receiving said high voltage generating circuit.

2. The image display apparatus as set forth in claim 1, wherein said ignitor module includes a lamp socket.

3. The image display apparatus as set forth in claim 1, wherein said lighting device and said power supply are mounted on a common board.

4. The image display apparatus as set forth in claim 1, wherein said ignitor module and said lighting device are mounted on a flexible printed board.

5. The image display apparatus as set forth in claim 1, wherein said high voltage generating circuit is surrounded by a case having walls, at least one of said walls forming an outer wall of said lamp house.

6. The image display apparatus as set forth in claim 1, wherein said partition interrupts heat radiation from said discharge lamp to said high voltage generating circuit.

7. The image display apparatus as set forth in claim 1, wherein
   said lamp house accommodates lead wires for connection of said high voltage generating circuit to said power source circuit of said ignitor module, and for connection of said discharge lamp to said lighting device, respectively, said lamp house being provided with the partition which is disposed between said lead wires and said discharge lamp.

8. The image apparatus as set forth in claim 1, wherein said cabinet includes a fan which makes a forced-air cooling for the interior of said cabinet, said high voltage generating circuit being arranged upstream of said discharge lamp with respect to a forced-air flow of said fan.

9. The image display apparatus as set forth in claim 1, wherein said storage section is filled with an insulation material.

10. The image display apparatus as set forth in claim 1, wherein said ignitor module is separated into
    a high voltage generating unit for applying said high voltage to said discharge lamp, and
    a power source unit which provides an electric power to said high voltage generating unit,
    said lamp house including a storage section which receives therein at least said high voltage generating unit.

* * * * *

UNITED STATES PATENT AND TRADEMARK OFFICE
CERTIFICATE OF CORRECTION

PATENT NO. : 6,783,248 B2
DATED : August 31, 2004
INVENTOR(S) : Miyata

It is certified that error appears in the above-identified patent and that said Letters Patent is hereby corrected as shown below:

Title page,
Item [57], ABSTRACT, should read:
-- A cabinet including a discharge lamp 13, an ignitor module 7, a lighting device 8A which is connected to the ignitor module, a signal processing unit 9, an image display, and a power supply supplying electric power to the above parts. A high voltage generating unit of the ignitor module 7 is arranged to be separated from the lighting device 8A and is disposed away from the signal processing unit 9 and close to the discharge lamp 13 so as to restrain a malfunction of the signal processing unit. --

Figure 14:
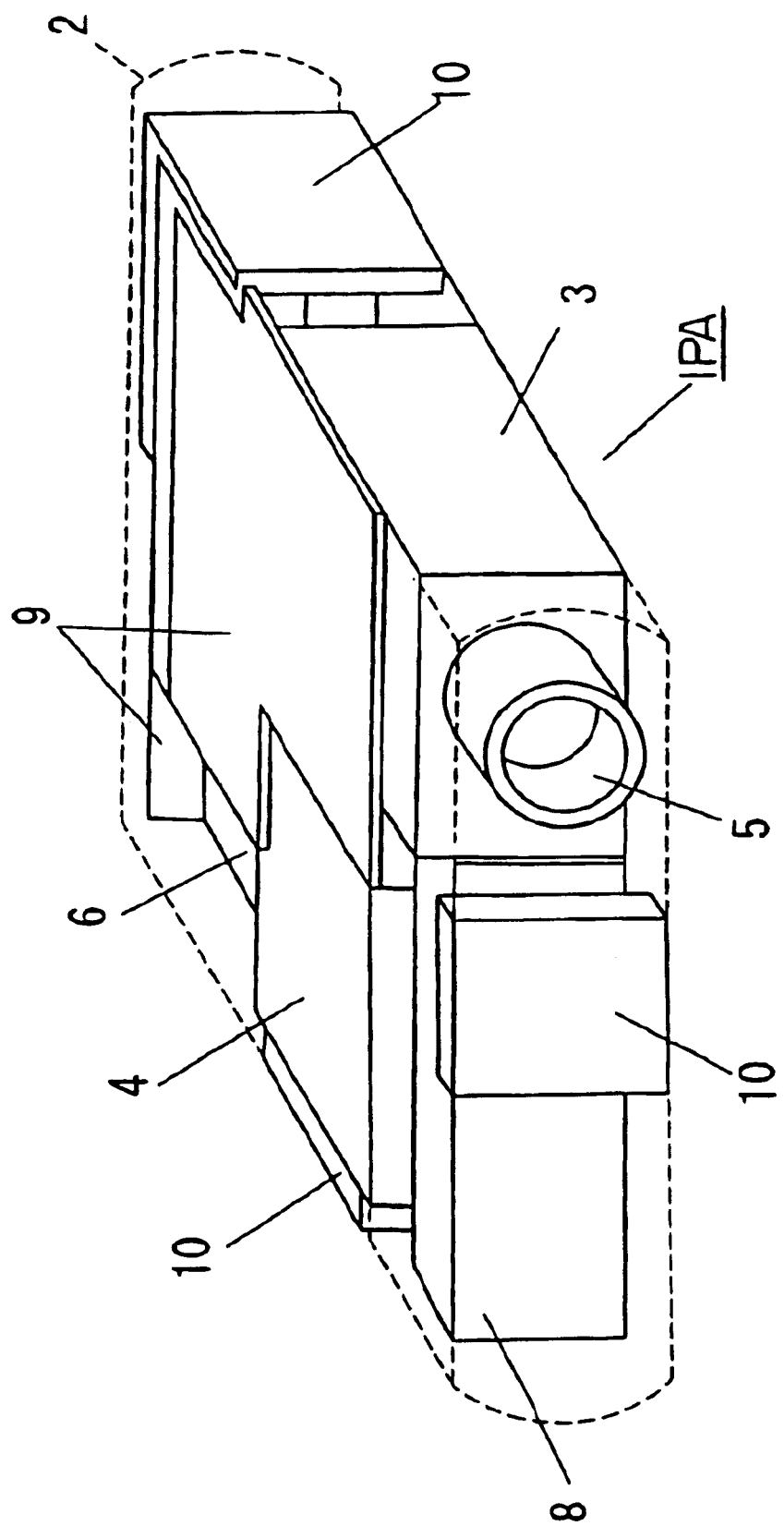
FIG. 14 is a perspective view illustrating the arrangement of various parts within a prior projector shown with a cabinet being removed.
Figure 15:
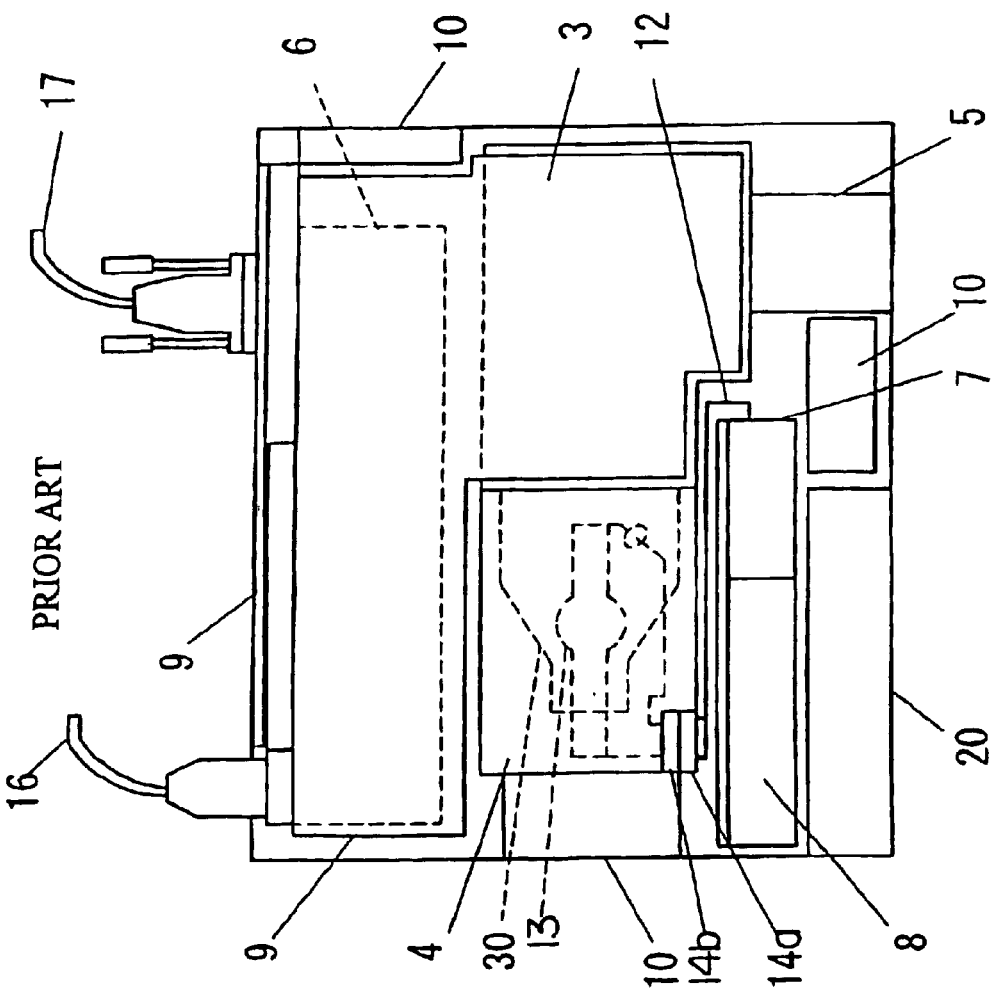
FIG. 15 is a top view illustrating the arrangement of the various parts within the projector.
Figure 16A:
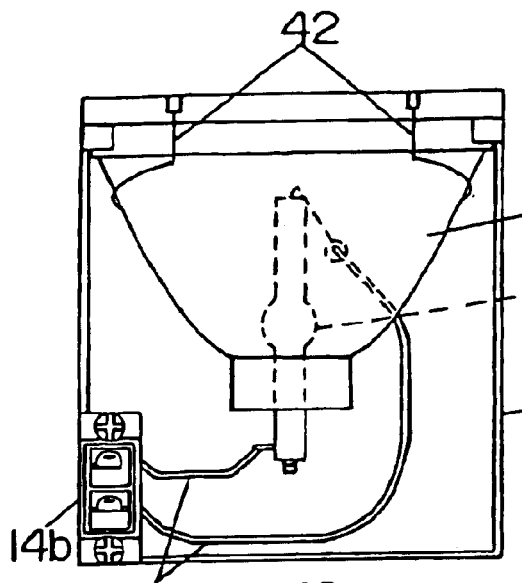
FIG. 16 illustrates the structure of a lamp house fitted within the above projector.
Figure 16B:
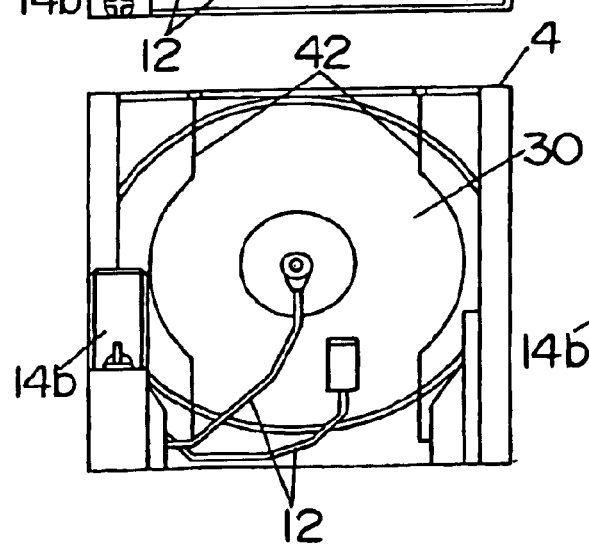
Figure 16C:
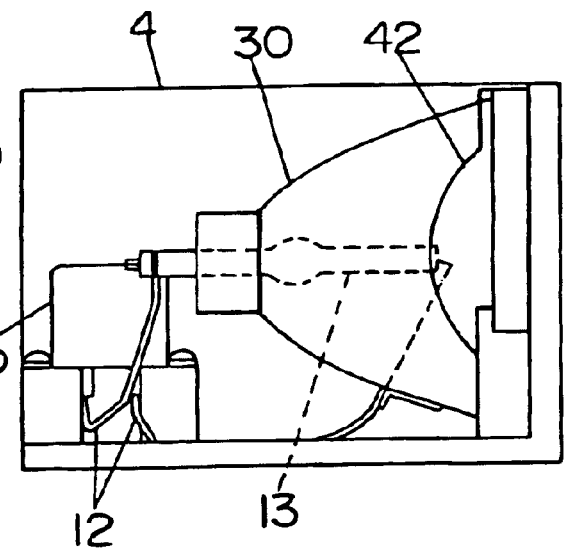

Column 1,
Line 12, change "FIGS. 14 to 14" to -- FIGS. 14 to 18 --

Column 4,
Line 56, change "Dilsclosure of the Invention" to -- Disclosure of the Invention --

Column 7,
Lines 29, 31-32, 33-34 and 36, delete "above image display apparatus"
Line 29, add -- fifth embodiment -- after "parts of the"
Lines 31-32 and 36, add -- fifth embodiment -- after "house of the"
Lines 33-34, add -- fifth embodiment -- after "block diagram of the"
Line 53, add -- art -- after "prior"
Line 56, add -- prior art -- after "within the"

Column 9,
Line 52, change "BA" to -- 8A --

Column 11,
Line 7, change "1A is a top view" to -- 11A is a top view --

UNITED STATES PATENT AND TRADEMARK OFFICE
CERTIFICATE OF CORRECTION

PATENT NO.   : 6,783,248 B2
DATED        : August 31, 2004
INVENTOR(S)  : Miyata It is certified that error appears in the above-identified patent and that said Letters Patent is hereby corrected as shown below:

<u>Column 13,</u>
Line 1, change "lamp 13, the" to -- lamp 13. The --

Signed and Sealed this

Nineteenth Day of April, 2005

JON W. DUDAS
*Director of the United States Patent and Trademark Office*